(12) United States Patent
Presi et al.

(10) Patent No.: US 8,909,048 B2
(45) Date of Patent: Dec. 9, 2014

(54) REFLECTIVE OPTICAL NETWORKS

(75) Inventors: Marco Presi, Pisa (IT); Fabio Cavaliere, Vecchiano (IT); Andrea Chiuchiarelli, Pisa (IT); Pallab Choudhury, Pisa (IT); Ernesto Ciaramella, Rome (IT); Giampiero Contestabile, Pisa (IT); Luca Giorgi, Ponsacco (IT); Roberto Proietti, Davis, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 352 days.

(21) Appl. No.: 13/382,762

(22) PCT Filed: Jul. 23, 2009

(86) PCT No.: PCT/EP2009/059480
§ 371 (c)(1),
(2), (4) Date: Apr. 23, 2012

(87) PCT Pub. No.: WO2011/003481
PCT Pub. Date: Jan. 13, 2011

(65) Prior Publication Data
US 2012/0321316 A1    Dec. 20, 2012

(30) Foreign Application Priority Data

Jul. 6, 2009 (EP) .................................... 09008848
Jul. 7, 2009 (EP) .................................... 09164734

(51) Int. Cl.
*H04J 14/00* (2006.01)
*H04B 10/2587* (2013.01)
*H04J 14/02* (2006.01)

(52) U.S. Cl.
CPC ........ *H04B 10/2587* (2013.01); *H04J 14/0282* (2013.01); *H04J 2014/0253* (2013.01)
USPC ......................................................... 398/67

(58) Field of Classification Search
CPC ..... H04J 14/02; H04J 3/1694; H04B 10/2587
USPC ......................................................... 398/67–70
See application file for complete search history.

(56) References Cited

U.S. PATENT DOCUMENTS 3,819,920 A * 6/1974 Goldfischer .................. 342/109
4,011,405 A * 3/1977 Ridout et al. ................. 375/232

(Continued)

FOREIGN PATENT DOCUMENTS

CN      101119163 A    2/2008
CN      201118601 Y    9/2008

(Continued)

OTHER PUBLICATIONS

Urban, et al., "Mitigation of Reflection-Induced Crosstalk in a WDM Access Network," OFC 2008, OThT3.

(Continued)

*Primary Examiner* — Ken Vanderpuye
*Assistant Examiner* — Abbas H Alagheband
(74) *Attorney, Agent, or Firm* — Baker Botts, LLP

(57) ABSTRACT

A reflective optical network (10) comprises an optical network unit (14) and an optical receiver (22). The optical network unit (14) comprises a reflective optical modulator (16) arranged to receive a seed optical signal, and a transmitter controller (18) arranged to receive a data signal (20) and to control the modulator (16) to apply the data signal (20) to the seed optical signal, to form an optical data signal. The transmitter controller (18) is arranged to process the data signal (20) to substantially prevent the optical data signal comprising spectral components at frequencies lower than a cut-off frequency, being the frequency at which a power spectral density of said optical data signal is lower than a peak power spectral density of said optical signal by a cut-off power value. The optical receiver (22) comprises an electrical domain high pass filter (26) having a cut-off frequency higher than a linewidth of the seed optical signal.

17 Claims, 8 Drawing Sheets

(56) References Cited

U.S. PATENT DOCUMENTS

| | | | |
|---|---|---|---|
| 4,450,358 A * | 5/1984 | Reynolds | 250/492.1 |
| 5,251,054 A | 10/1993 | Lynn | |
| 5,661,585 A * | 8/1997 | Feldman et al. | 398/63 |
| 6,588,950 B1 * | 7/2003 | Pfeiffer | 398/140 |
| 7,088,921 B1 * | 8/2006 | Wood | 398/67 |
| 7,283,216 B1 * | 10/2007 | Geng et al. | 356/35.5 |
| 7,522,842 B1 * | 4/2009 | McNicol et al. | 398/157 |
| 7,601,940 B2 * | 10/2009 | Chew et al. | 250/214 AG |
| 2002/0000466 A1 * | 1/2002 | Lucera et al. | 235/462.01 |
| 2003/0143949 A1 * | 7/2003 | Karabinis | 455/12.1 |
| 2005/0123298 A1 * | 6/2005 | Kim et al. | 398/70 |
| 2006/0171393 A1 * | 8/2006 | Lin et al. | 370/392 |
| 2006/0275039 A1 * | 12/2006 | Chen et al. | 398/140 |
| 2007/0019956 A1 * | 1/2007 | Sorin et al. | 398/71 |
| 2007/0166038 A1 * | 7/2007 | Yano | 398/79 |
| 2008/0230684 A1 * | 9/2008 | Chew et al. | 250/214 AG |
| 2009/0238257 A1 * | 9/2009 | Steinberger et al. | 375/230 |
| 2010/0278535 A1 * | 11/2010 | Kim | 398/72 |
| 2010/0322624 A1 * | 12/2010 | Liu et al. | 398/41 |
| 2011/0026923 A1 * | 2/2011 | Kim et al. | 398/79 |
| 2011/0222855 A1 * | 9/2011 | Kim et al. | 398/79 |

FOREIGN PATENT DOCUMENTS

| | | |
|---|---|---|
| EP | 0 717 516 | 6/1996 |
| WO | WO 2008/047996 | 4/2008 |

OTHER PUBLICATIONS

International Search Report for PCT/EP2009/059480, mailed May 4, 2010.

Papagiannakis, I. et al., "Upstream Transmission in WDM PONs at 10Gbps Using Low Bandwidth RSOAs Assisted with Optical Filtering and Electronic Equalization", ECOC2008, (Sep. 21, 2008), 2 pages.

Search Report issued by the State Intellectual Property Office of People's Republic China for Application No. 200980160365.8, Jan. 8, 2014.

* cited by examiner

REFLECTIVE OPTICAL NETWORKS

This application is the U.S. national phase of International Application No. PCT/EP2009/059480, filed 23 Jul. 2009, which designated the U.S. and claims priority to EP Application No. 09008848.5, filed 6 Jul. 2009;and EP Application No. 09164734.7, filed 7 Jul. 2009; the entire contents of each of which are hereby incorporated by reference.

FIELD OF THE INVENTION

The invention relates to a reflective optical network, an optical network unit and an optical receiver for a reflective optical network, and to a method of transmitting data in a reflective optical network and to providing an optical data signal for transmission in a reflective optical network.

BACKGROUND OF THE INVENTION

Reflective optical network architectures seeded with a continuous wave (CW) optical signal have been recognized as a viable solution to deploy wavelength division multiplexed (WDM) Passive Optical Networks (PONs) in which the Optical Network Units (ONUs) are wavelength agnostic ("colourless"). The performance of reflective optical networks is limited by the power budget on the upstream optical path, which is twice as long as the downstream path, and by channel cross-talk induced by lumped or distributed reflections along the fibre link. The main limiting factor in the uplink channel is coherent crosstalk generated by Rayleigh Back-scattering (RB) and by randomly located reflective sites such as fibre connectors and splices. One proposed solution to this problem has been to use reflective modulators which provide optical gain at the ONUs, such as a reflective semiconductor optical amplifier (R-SOA), to keep the uplink crosstalk-to-signal ratio (C/S) at an acceptable value. However, ONU gain cannot be increased arbitrarily: above a threshold it also strongly amplifies the crosstalk. Another proposed solution, reported by P. J. Urban et al, "Mitigation of reflection induced cross-talk in a WDM access network", OFC 2008, OThT3", is phase modulation of the CW seed signal. However, the phase modulation must be operated at frequencies outside the data bandwidth, and this likely to be neither a practical nor cheap solution in real systems.

SUMMARY OF THE INVENTION

It is an object to provide an improved reflective optical network. It is a further object to provide an improved optical network unit for a reflective optical network. It is a further object to provide an improved optical receiver for a reflective optical network. It is a further object to provide an improved method of transmitting data in a reflective optical network.

A first aspect of the invention provides a reflective optical network. The said network comprises an optical network unit and an optical receiver. Said optical network unit comprises a reflective optical modulator and a transmitter controller. Said reflective optical modulator is arranged to receive a seed optical signal. Said transmitter controller is arranged to receive a data signal. Said transmitter controller is arranged to control said modulator to apply said data signal to said seed optical signal, to form an optical data signal. Said transmitter controller is further arranged to process said received data signal to substantially prevent said optical data signal comprising spectral components at frequencies lower than a cut-off frequency. Said cut-off frequency is the frequency at which a power spectral density of said optical data signal is a predetermined percentage of a peak power spectral density of said optical signal. Said optical receiver is arranged to receive said optical data signal. Said optical receiver comprises an electrical domain high pass filter having a cut-off frequency higher than a linewidth of said seed optical signal.

The reflective optical network thus has improved tolerance to reflections and back-scattered optical signals. The high pass filtering of the received optical signal and the processing of the data signal to remove low frequency spectral components from the resulting optical data signal allows the reflective optical network to tolerate very low upstream carrier to signal values. The reflective optical network also has enhanced resilience to lumped and distributed reflections. The processing of the data signal carried out by the transmitter controller substantially removes spectral components from the resulting optical data signal which would result in inter-symbol interference, whilst the high pass filtering carried out at the receiver ensures that the correct mean power is removed from power measurements. The optical network therefore has improved tolerance at the receiver to carrier to signal value degradation.

In an embodiment, said cut-off frequency is the frequency at which a power spectral density of said optical data signal is a factor of at least 10 dB lower than said peak power spectral density and may be at least 20 dB lower than said peak power spectral density. In an embodiment, said cut-off frequency is higher than 10 MHz and may be higher than 100 MHz. The high pass filter is thus able to reject interferometric noise components around the direct current electrical frequency.

In an embodiment, said transmitter controller is arranged to process said received data signal by applying a line code to said received data signal. In an embodiment, said line code comprises a direct-current-balanced (DC-balanced) line code. The direct-current-balanced line code may comprise an 8B10B line code or a 64B66B line code. Line-encoding the data signal removes the low frequency spectral components of the resulting optical data signal, thereby mitigating the effects of inter-symbol interference at the optical receiver. The 8B10B and 64B66B line codes are well known, and the 8B10B line code is implemented in Gigabit-Ethernet and Fibre Channel standards, so the optical network is compatible with existing encoding standards. The high pass filtering of the received optical data signal and the encoding of the data signal prior to transmission allows the optical network to tolerate very low upstream carrier to signal values.

In an embodiment, said transmitter controller comprises a scrambler and said transmitter controller is arranged to process said received data signal by scrambling said received data signal in said scrambler. Data scrambling is a well know data processing technique that is widely used in telecommunications network, so the optical network is compatible with existing encoding standards.

In an embodiment, said high pass filter cut-off frequency is additionally lower than a bandwidth of said data signal.

In an embodiment, said reflective optical modulator comprises one of a reflective semiconductor optical amplifier and a reflective electro-absorption modulator. In an embodiment, said reflective optical modulator is operable to apply gain to at least one of said seed optical signal and said optical data signal. In an embodiment, said reflective optical modulator is polarization independent. The reflective optical modulator can be operated with or without gain, and can thus be used to provide optical gain to control the crosstalk to signal value.

In an embodiment, the network further comprises a seed optical source operable to generate said seed optical signal, said seed optical source being located remote from said optical network unit and connected to said optical network unit by an optical fibre link. In an embodiment, said seed optical source is operable to generate a continuous wave optical signal. Said seed optical source may comprise a seed laser.

In an embodiment, said reflective optical network comprises a passive optical network. In an embodiment, said optical receiver is provided in one of an optical line terminal or a central office of said passive optical network.

In an embodiment, said reflective optical network comprises a wavelength division multiplexed network. In an embodiment, said optical access network comprises a plurality of seed optical sources operable to generate a plurality of seed optical signals, a corresponding plurality of reflective optical modulators and a corresponding plurality of optical receivers.

A second aspect of the invention provides an optical network unit for a reflective optical network. Said optical network unit comprises a reflective optical modulator and a transmitter controller. Said reflective optical modulator is arranged to receive a seed optical signal. Said transmitter controller is arranged to receive a data signal. Said transmitter controller is arranged to control said modulator to apply said data signal to said seed optical signal, to form an optical data signal. Said transmitter controller is further arranged to process said received data signal to substantially prevent said optical data signal comprising spectral components at frequencies lower than a cut-off frequency. Said cut-off frequency is the frequency at which a power spectral density of said optical data signal is a predetermined percentage of a peak power spectral density of said optical signal by a cut-off power value.

The optical network unit provides an optical data signal from which spectral components at frequencies lower than a cut-off frequency are substantially removed, thus mitigating the effects of inter-symbol interference when the optical data signal is received.

In an embodiment, said cut-off frequency is the frequency at which a power spectral density of said optical data signal is a factor of at least 10 dB lower than said peak power spectral density and may be at least 20 dB lower than said peak power spectral density.

In an embodiment, said transmitter controller is arranged to process said received data signal by applying a line code to said received data signal. In an embodiment, said line code comprises a direct-current-balanced (DC-balanced) line code. The direct-current-balanced line code may comprise an 8B10B line code or a 64B66B line code.

In an embodiment, said transmitter controller comprises a scrambler and said transmitter controller is arranged to process said received data signal by scrambling said received data signal in said scrambler.

In an embodiment, said reflective optical modulator is operable to apply gain to at least one of said seed optical signal and said optical data signal. In an embodiment, said reflective optical modulator comprises one of a reflective semiconductor optical amplifier and a reflective electro-absorption modulator. In an embodiment, said reflective optical modulator is polarization independent.

In an embodiment, said network further comprises a seed optical source operable to generate said seed optical signal. Said seed optical source is located remote from said optical network unit. Said seed optical source is connected to said optical network unit by an optical fibre link.

In an embodiment, said reflective optical network comprises a passive optical network.

A third aspect of the invention provides an optical receiver for a reflective optical network. Said optical receiver is arranged to receive an optical data signal generated from a seed optical signal. Said optical receiver comprises an electrical domain high pass filter having a cut-off frequency higher than a linewidth of said seed optical signal.

The optical receiver is able to provide improved optical power measurements since the high pass filtering provided acts to subtract the correct mean power and the optimal threshold of the receiver does not change with variations in carrier to signal value. The optical receiver therefore has improved tolerance to degradation in carrier to signal value caused by interference from back-scattered light in a reflective optical network.

A fourth aspect of the invention provides a method of transmitting data in a reflective optical network. Said method comprises receiving a data signal to be transmitted and processing said received data signal. Said processed data signal is applied to a seed optical signal, to form an optical data signal. Said processing is arranged to substantially prevent said optical data signal comprising spectral components at frequencies lower than a cut-off frequency. Said cut-off frequency is the frequency at which a power spectral density of said optical data signal is predetermined percentage of a peak power spectral density of said optical signal. Said method further comprises receiving said optical data signal and converting it into an electrical signal. A high pass filter is applied to said electrical signal. Said filter has a cut-off frequency higher than a linewidth of said seed optical signal.

The method enables data to be transmitted in a reflective optical network with improved tolerance to reflections and back-scattering within the network. The high pass filtering of the received optical signal and the processing of the data signal to remove low frequency spectral components from the resulting optical data signal allows data to be transmitted with very low upstream carrier to signal values. The method also provides enhanced resilience of data transmission to lumped and distributed reflections. The processing of the data signal substantially removes spectral components from the resulting optical data signal which would result in inter-symbol interference, whilst the high pass filtering ensures that the correct mean power is removed from power measurements. The method therefore allows improved tolerance to carrier to signal value degradation when receiving an optical data signal.

In an embodiment, said cut-off frequency is the frequency at which a power spectral density of said optical data signal is a factor of at least 10 dB lower than said peak power spectral density and may be at least 20 dB lower than said peak power spectral density. In an embodiment, said cut-off frequency is higher than 10 MHz and may be higher than 100 MHz.

In an embodiment, said processing comprises applying a line code to said received data signal. In an embodiment, said line code comprises a direct-current-balanced (DC-balanced) line code. The direct-current-balanced line code may comprise an 8B10B line code or a 64B66B line code.

Line-encoding the data signal removes the low frequency spectral components of the resulting optical data signal, thereby mitigating the effects of inter-symbol interference at the optical receiver. The 8B10B and 64B66B line codes are well known, and the 8B10B line code is implemented in Gigabit-Ethernet and Fibre Channel standards, so the optical network is compatible with existing encoding standards. The high pass filtering of the received optical data signal and the encoding of the data signal prior to transmission allows data to be transmitted with very low upstream carrier to signal values.

In an embodiment, said processing comprises scrambling said received data signal.

In an embodiment, said high pass filter cut-off frequency is additionally lower than a bandwidth of said data signal.

In an embodiment, said reflective optical network comprises a passive optical network. In an embodiment, said optical receiver is provided in one of an optical line terminal or a central office of said passive optical network.

A fifth aspect of the invention provides a method of providing an optical data signal for transmission in a reflective optical network. Said method comprises receiving a data signal to be transmitted and processing said received data signal. Said processed data signal is applied to a seed optical signal, to form an optical data signal. Said processing is arranged to substantially prevent said optical data signal comprising spectral components at frequencies lower than a cut-off frequency. Said cut-off frequency is the frequency at which a power spectral density of said optical data signal is a predetermined percentage of a peak power spectral density of said optical signal.

In an embodiment, said cut-off frequency is the frequency at which a power spectral density of said optical data signal is a factor of at least 10 dB lower than said peak power spectral density and may be at least 20 dB lower than said peak power spectral density. In an embodiment, said cut-off frequency is higher than 10 MHz and may be higher than 100 MHz.

In an embodiment, said processing comprises applying a line code to said received data signal. In an embodiment, said line code comprises a direct-current-balanced (DC-balanced) line code. The direct-current-balanced line code may comprise an 8B10B line code or a 64B66B line code.

In an embodiment, said processing comprises scrambling said received data signal.

In an embodiment, said reflective optical network comprises a passive optical network.

A sixth embodiment of the invention provides a method of processing an optical data signal generated from a seed optical signal in a reflective optical network. The method comprises receiving said optical data signal and converting it into an electrical signal. A high pass filter is applied to said electrical signal. Said filter has a cut-off frequency higher than a linewidth of said seed optical signal.

A seventh aspect of the invention provides a data carrier having computer readable instructions embodied therein. The said computer readable instructions are for providing access to resources available on a processor. The computer readable instructions comprise instructions to cause the processor to perform any of the above steps of the method of transmitting data in a reflective optical network.

Embodiments of the invention will now be described in detail, by way of example only, with reference to the accompanying drawings.

DESCRIPTION OF EMBODIMENTS OF THE INVENTION

Figure 1:
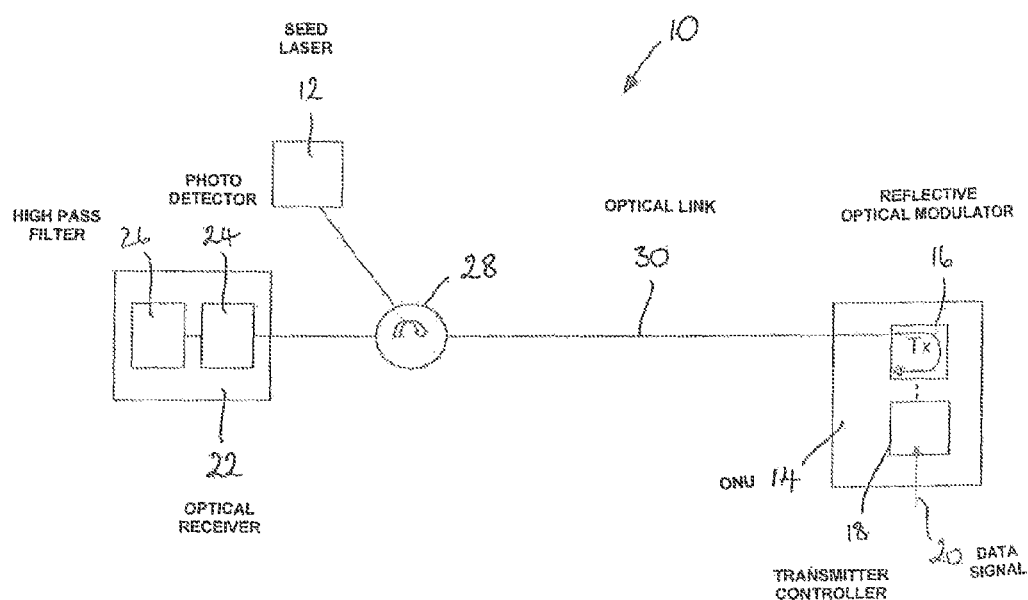
FIG. 1 is a schematic representation of a reflective optical access network according to a first embodiment of the invention, shown together with an optical link and a seed laser.

Referring to FIG. 1, a first embodiment of the invention provides a reflective optical network 10 comprising an optical network unit (ONU) 14 and an optical receiver 22.

The ONU 14 comprises a reflective optical modulator 16, which in this example comprises a reflective semi-conductor optical amplifier (R-SOA), and a transmitter controller 18. The R-SOA 16 is arranged to receive a seed optical signal. The transmitter controller 18 is arranged to receive a data signal 20, comprising data to be transmitted to the optical receiver 22.

Typically, the ONU 14 and the optical receiver 22 are connected by an optical link 30, which is shown for clarity in FIG. 1 but which does not form part of this embodiment. A seed laser 12, which similarly does not form part of this embodiment, will also typically be provided to generate the seed optical signal, which is coupled to the optical link 30 by an optical circulator 28, the optical link 30 delivering the seed optical signal to the R-SOA 16.

In this example, the R-SOA 16 has a gain of substantially 1 and therefore does not provide any amplification to the seed optical signal or the resulting optical data signal. It will be appreciated that the R-SOA 16 may alternatively be operated in a gain regime, with a higher gain value in order to apply amplification to the optical signal.

The transmitter controller 18 is arranged to receive the data signal 20 and to control the R-SOA 16 to apply the data signal to a received seed optical signal. A received seed optical signal is thus transformed into an optical data signal, carrying the data 20 to be transmitted.

The transmitter controller 18 is also arranged to process the received data signal to substantially prevent the resulting optical data signal from comprising spectral components below a certain cut-off frequency. The cut-off frequency is the frequency at which the power of the resulting optical data signal is a predetermined percentage of the peak power of the optical data signal. In this example, the cut-off frequency is the frequency at which the power of the optical data signal is −25 dB of (i.e. a factor of 25 dB lower than) the peak optical power of the optical data signal. The optical power is measured in dBm in this example. The optical receiver 22 comprises a photodetector 24, arranged to receive an optical data signal and to convert it into an electrical signal, and an electrical high pass filter 26 arranged to receive the resulting electrical signal. The high pass filter 26 has a cut-off frequency which is higher than the linewidth of the seed optical signal from which the optical data signal originated. In this example, the cut-off frequency is at the −25 dB bandwidth of the high pass filter 26.

In prior art optical networks using alternating current (AC) coupled receivers, the AC coupled receivers have cut-off frequencies which are significantly lower than the linewidth of the optical carrier signals propagating in the network, in order to avoid the generation of inter-symbol interference (ISI). In a reflective optical network, such as the one shown in FIG. 1, an AC coupled receiver is not able to compensate for fast average power variations induced by interference between an uplink optical signal and back-scattered light from the seed optical signal. As a result, a power penalty is introduced to the uplink optical signal because the optimal threshold for the optical receiver changes rapidly over time, whilst the mean power seen by the receiver is unaffected, due to it being averaged on a timescale given by the low frequency cut-off of the AC coupled receiver, which is much longer (typically ~1/kHz) than the coherence time (typically ~1/MHz) of the optical carrier signal.

This problem can be mitigated by using AC coupled receivers having a cut-off frequency higher than the linewidth of the seed optical signal. Doing so results in the high pass filtering operated by the receiver always acting to subtract the correct mean power, since the average of the power is now performed on the correct timescale, and the optimal threshold of the receiver does not change with the carrier to signal value. The optical receiver is thus more tolerant to degradation in the carrier to signal value, caused by the interference from back-scattered light. However, this approach has the problem of introducing ISI.

The reflective optical network 10 shown in FIG. 1 overcomes the above problems because the processing of the data signal carried out by the transmitter controller 18 prevents the optical data signal from comprising components at low frequencies which would result in ISI, whilst ensuring that high-pass filtering is provided at the receiver to subtract the correct mean power. Improved tolerance of the receiver 22 to carrier to signal value degradation is thus provided.

Figure 2:
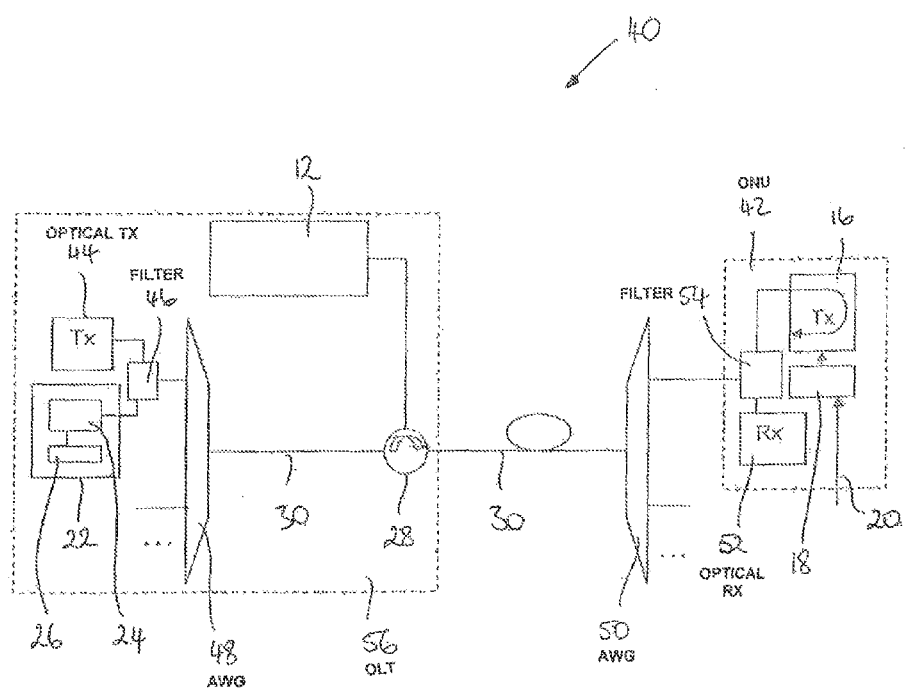
FIG. 2 is a schematic representation of a reflective optical access network according to a second embodiment of the invention.

A reflective optical network 14 according to a second embodiment of the invention is shown in FIG. 2. The same reference numbers are retained for features corresponding to those shown in FIG. 1.

The reflective optical network 40 comprises an optical network unit (ONU) 42 and an optical receiver 22. The reflective optical network 40 further comprises an optical link 30 coupled between the optical receiver 22 and the ONU 42. A seed optical source 12 is provided which is operable to generate a seed optical signal. The seed optical source is located remote from the ONU 42 and is connected to the ONU by the link 30, being coupled to the link 30 by an optical circulator 28.

In this example, the optical receiver 22 is provided within an optical line termination (OLT) 56. The OLT 56 is further provided with a downlink optical transmitter 44 which is coupled via a bandsplit filter 46 and a cyclic arrayed waveguide grating (AWG) 48 to the optical link 30. The optical receiver 22 is similarly connected to the optical link 30 via the AWG 48 and the bandsplit filter 46.

The optical receiver 22 comprises a photodiode 24 arranged to receive an uplink optical data signal and to generate a corresponding output electrical data signal. The optical receiver 22 further comprises a high pass electrical filter 26 arranged to receive the output electrical signal from the photodiode 24.

The ONU 42 comprises an R-SOA 16, which is coupled to the optical link 30 by a second cyclic AWG 50 and a second bandsplit filter 54. The ONU 42 further comprises a transmitter controller 18 which is arranged to receive a data signal 20 for uplink data transmission to the OLT 56. The ONU 42 further comprises a downlink optical receiver 52, arranged to receive a downlink optical data signal from the OLT 56.

The bandsplit filter 54 acts to split the downlink optical signal channel to the receiver 52 and a seed optical signal to the R-SOA 16. As will be well understood by the person skilled in the art, in a reflective optical network of this type downlink optical signals are provided within a first wavelength band and uplink optical signal channels are provided within a second wavelength band, spaced from the first wavelength band. The downlink optical signal and the seed optical signal are thus spaced in wavelength, by the free spectral range (FSR) of the cyclic AWG, and can be routed together through the AWG 50, and directed to the optical receiver 52 and the R-SOA 16 by the bandsplit filter 54 respectively.

The R-SOA 16 is arranged to receive a seed optical signal and the transmitter controller 18 is arranged to control the R-SOA 16 to apply a data signal 20 to the received seed optical signal. The R-SOA 16 in this example operates within a zero gain regime, so that it merely reflects and modulates a seed optical signal without applying gain to the optical signal. It will be appreciated that the R-SOA 16 may alternatively comprise an optical modulator operating with a positive gain, and may comprise a different type of reflective optical modulator, such as a reflective electro-absorption modulator.

The transmitter controller 18 is arranged to process a received data signal to substantially prevent the resulting optical data signal comprising spectral components at frequencies lower than a cut-off frequency, which is pre-determined by a system designer. The cut-off frequency is the frequency at which a power spectral density of the optical data signal is a predetermined percentage of the peak power spectral density of the optical data signal. Typically, the cut-off frequency is the frequency at which the power spectral density of the optical data signal is at least 10 dB lower than its peak power spectral density, that is to say the power spectral density at the cut-off frequency is −10 dB of the peak power spectral density. In this example, the cut-off frequency is at a power spectral density which is 25 dB lower than the peak power spectral density. The power spectral density is measured in dBm.

In this embodiment, the transmitter controller 18 is arranged to process the data signal by applying a direct current (DC)-balanced line code, which is this example comprises an 8B10B ether net standard line code. Other DC-balanced line codes may alternatively be used, such as the 64B66B line code, or other data processing techniques may be used to prevent the optical data signal comprising components at frequencies below the cut-off frequency. One such processing technique which may be used is data scrambling, which will be well known to persons skilled in the art.

In use, the downlink optical transmitter 44 generates and transmits a downlink optical data signal which is routed via the bandsplit filter 46, AWG 48, optical link 30 and AWG 50 to the ONU 42. At the same time, a seed optical signal is coupled from the seed laser 12 into the optical link 30, via the optical circulator 28, and is routed via the AWG 50 and the bandsplit filter 54 to the R-SOA 16 of the ONU 42. The downlink optical data signal is routed by the bandsplit filter 54 in the ONU 42 to the downlink optical receiver 52. The seed optical signal forms the optical carrier for an uplink optical signal, and is reflected and modulated by the R-SOA 16, as described above, in order to apply a data signal 20 for uplink transmission to the OLT 56. The processing of the data signal 20 to apply the 8B10B line code prior to uplink transmission, together with the high pass electrical filtering performed at the optical receiver 22, provides improved tolerance of the upstream signal to signal to carrier degradation without resulting in ISI. Very low upstream carrier to signal values, for example −10 dB, can thus be tolerated by the optical network 40. The optical network 40 is also thus given enhanced resilience to lumped and distributed reflections.

Figure 3:
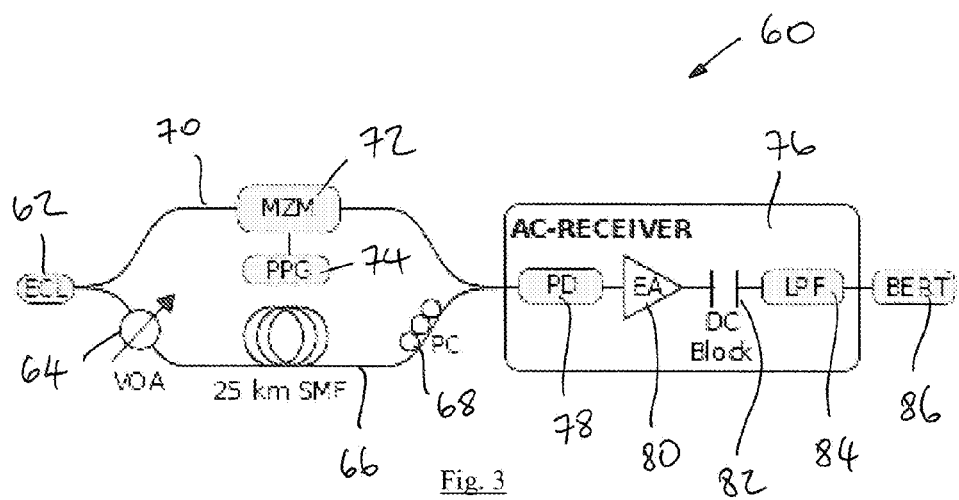
FIG. 3 is a schematic representation of an experimental test representation of a reflective optical network as shown in FIG. 2.

FIG. 3 shows an experimental representation of the reflective optical network 40 of FIG. 2, which was used to assess the power penalty at the optical receiver 22 as a function of the carrier to signal value of the uplink optical data signal.

The experimental setup comprises an external cavity laser (ECL) 62 having a 100 kHz linewidth to emulate a CW optical seed signal. The signal from the ECL 62 was split in two paths: the first path comprised a variable optical attenuator (VOA) 64, 25 km of single mode fibre 66 and a polarization controller (PC) 68; and the second path contained a Mach-Zehnder modulator (MZM) 72, driven by a pulse generator (PPG) 74. The two paths were recombined at their far ends and the output coupled to a receiver 76. The receiver 76 comprised an AC-coupled receiver, comprising a PIN detector 78 with an electrical amplifier (EA) 80 coupled to its electrical output. The PIN detector 78 threshold was set to ½ (<P1>+<P0>), where <P1> and <P0> are the average optical power on the mark and space levels of the modulated optical signal respectively. The output of the amplifier 80 is coupled to a high pass electrical filter having a 7 kHz cut-off frequency. A 933 MHz Bessel low-pass filter was provided for optimal pulse reformatting. The receiver of this test arrangement is referred to herein as "Type I".

The experimental setup allows crosstalk generated by reflections caused by echoes over paths longer than the CW coherence length to be emulated. The VOA 64 was used to set the carrier to signal (C/S) value, and the PC 68 was used to maximise the interference between the signals from the two paths.

Figure 4:
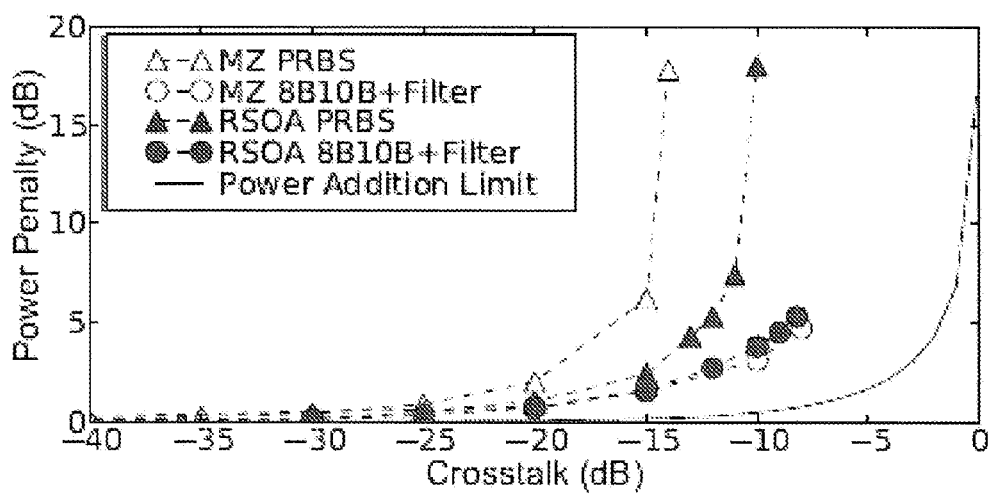
FIG. 4 shows the power penalty (dB) as a function of crosstalk (dB) for four different optical data signal types.

In a first test, the MZM 72 was first driven by a Pseudo Random Bit Sequence (PRBS) 27-1 bit long at a 1.25 Gb/s data rate. The power penalty was measured at an error rate of 10-9 as a function of the C/S. The results are shown in FIG. 4 as the open triangle data points.

In a second test, the Mach-Zehnder modulator was driven with a 8B10B encoded PRBS and the measurements repeated. Due to the 25% overhead associated with the 8B10B code, the data sequence was 156 bit long. In this test the cut-off frequency of the high pass filter 82 was changed to 100 MHz, i.e. higher than the linewidth of the seed laser; this arrangement is referred to herein as "Type II". Using a 100 MHz high pass filter rejected interferometric noise components around the DC electrical frequency. The results are shown in FIG. 4 as the open circle data points.

In a third test, the first and second tests were repeated using an R-SOA in place of the Mach-Zehnder modulator. The R-SOA had a 20 dB small signal gain at 80 mA bias current, 3 dBm output saturated power, 1.5 dB polarization dependent gain and 1.5 GHz electrical bandwidth. The input signal to the R-SOA had an optical power level of −10 dBm. The results for the R-SOA driven by the PRBS are shown in FIG. 4 is the closed triangle data points and the results for the R-SOA driven by the 8B10B encoded PRBS are shown in FIG. 4 as the closed circle data points.

When PRBS sequences are used, the power penalty becomes significant starting at C/S values of −20 dB, and error rate floors are observed around C/S of −15 dB. When the 8B10B line coding is used together with the Type II receiver, the tolerance to C/S degradation is enhanced and both modulators show the same power penalty vs. C/S. For a Mach-Zehnder modulator the tests shown that use of the 8B10B allows to recover a 16 dB power penalty at C/S=−14 dB. In the case of the R-SOA, the test show a 6 dB improvement in power penalty for C/S=−10 dB.

Figure 5:
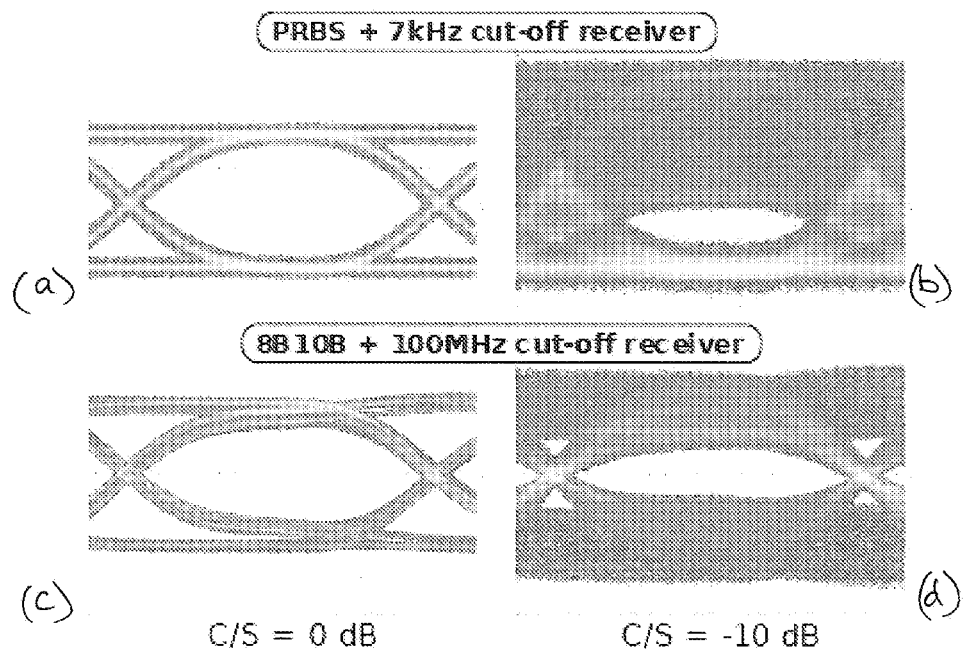
FIG. 5 shows eye diagrams for four different optical signal types.

FIG. 5 shows eye diagrams for two C/S values (0 dB and −10 dB) recorded when receiving a PRBS sequence with the Type I receiver and an 8B10B encoded sequence received with the Type II receiver. All eye diagrams are recorded with the same vertical offset. The timescale is 100 ps/division.

When using a Type I receiver, the noise affects mainly the "mark" symbols and the optimal threshold position changes dramatically when crosstalk is added. In contrast, if 8B10B coding is used together with the Type II receiver, as in the present invention, the optimal threshold position is unchanged because the noise is equally distributed both on mark and space levels.

It will be appreciated that the Mach-Zehnder modulator described above is used simply to provide a modulated optical signal in a test arrangement and that any reflective optical modulator may be used in practice, independent of whether it provides signal gain or not. For example, a reflective electro-absorption modulator may be used in place of the R-SOA described above. It will also be appreciated that other DC-balanced line codes may be used in place of the 8B10B coding described above, including, for example, 64B66B.

Figure 6:
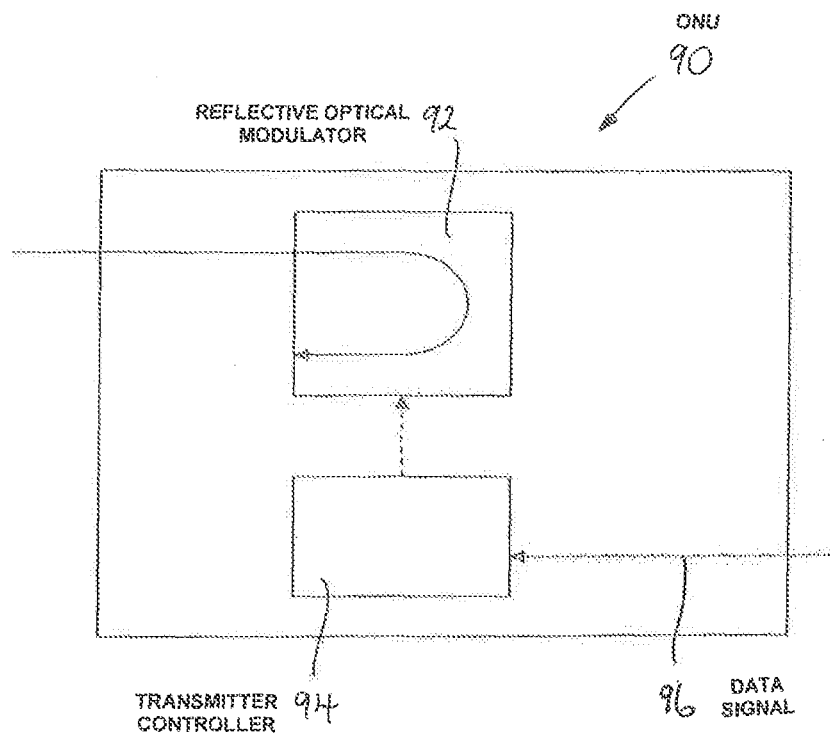
FIG. 6 is a schematic representation of an optical network unit according to a third embodiment of the invention.

Referring to FIG. 6, a third embodiment of the invention provides an optical network unit 90 for a reflective optical network. The optical network unit (ONU) 90 is substantially the same as the ONU 14 of FIG. 1 and comprises a reflective optical modulator 92 and a transmitter controller 94.

In this example, the reflective optical modulator 92 comprises an R-SOA, but it may alternatively comprise a different type of reflective optical modulator, including a reflective electro-absorption modulator (R-EAM). The R-SOA 92 is arranged to receive a seed optical signal, which is reflected and modulated by the R-SOA. The transmitter controller 94 is arranged to receive a data signal 96 and to control the R-SOA 92 to apply the data signal 20 to the seed optical signal, to form an optical data signal for transmission.

The R-SOA 92 has a gain of substantially 1 and therefore does not provide any amplification to the seed optical signal or the resulting optical data signal. It will be appreciated that the R-SOA 92 may alternatively be operated in a gain regime, with a higher gain value in order to apply amplification to the optical signal.

The transmitter controller 94 is arranged to process the received data signal to substantially prevent the resulting optical data signal comprising spectral components at frequencies lower than a cut-off frequency. The cut-off frequency is the frequency at which the power spectral density of the optical data signal is a predetermined percentage of the peak power spectral density of the optical data signal. In this example, the cut-off frequency is at a power spectral density which is 25 dB lower than the peak power spectral density. The power spectral density is measured in dBm. The transmitter controller 94 is arranged to process the data signal by applying a line code to it, which in this example comprises a DC-balanced line code in the form of the ethernet 8B10B line code.

Figure 7:
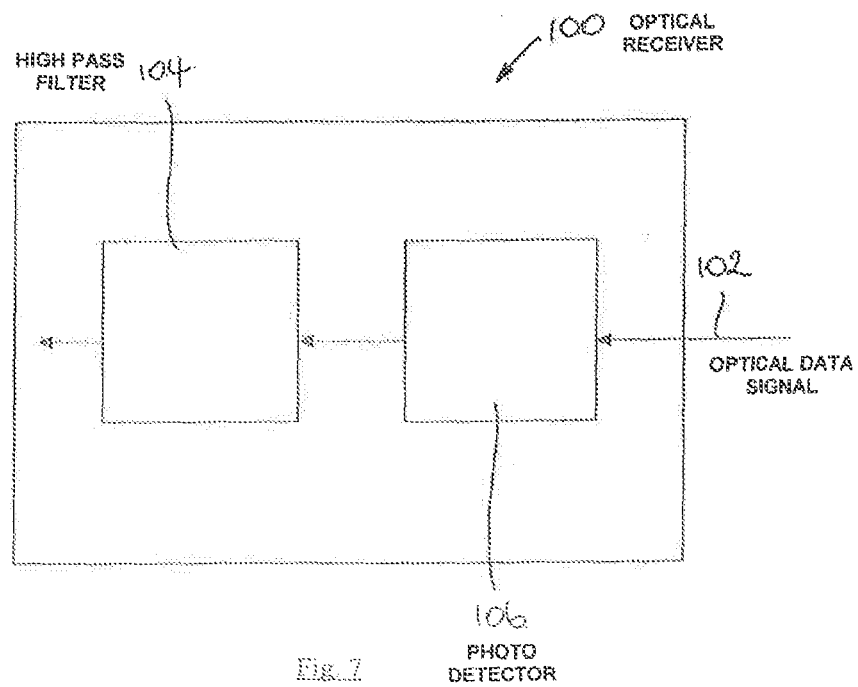
FIG. 7 is a schematic representation of an optical receiver according to a fourth embodiment of the invention.

Referring to FIG. 7, a fourth embodiment of the invention provides an optical receiver 100, which is substantially the same as the optical receiver 22 of FIG. 1. The optical receiver 100 comprises a photodetector 106 arranged to receive an optical data signal 102. The photodetector 106 is arranged to convert a received optical data signal into an electrical signal. The optical receiver 100 further comprises an electrical high pass filter 104 arranged to receive the electrical signal generated by the photodetector 106. The high pass filter 104 has a cut-off frequency which is higher than the linewidth of a seed optical signal from which the optical data signal 102 originated. In this example, the cut-off frequency is at the −25 dB bandwidth of the high pass filter 104.

A fifth embodiment of the invention provides a method 110 of transmitting data in a reflective optical network. The method 110 is suitable for transmitting data in the reflective optical networks 10, 40 as described above.

The method comprises receiving a data signal to be transmitted 112, processing the received data signal 114, and applying the processed data signal to a seed optical signal to form an optical data signal 116. The resulting optical data signal is then transmitted 118. The transmitted optical data signal is subsequently received and converted into an electrical signal 120. A high pass filter is applied to the resulting electrical signal 122. The high pass filter has a cut-off frequency which is higher than the linewidth of the seed optical signal.

The processing of the data signal is arranged to substantially prevent the resulting optical data signal comprising spectral components at frequencies lower than a cut-off frequency 114. The cut-off frequency is the frequency at which the power of the resulting optical signal is a predetermined percentage of its peak power. For example, the cut-off frequency may be at a power of −10 dB or up to −25 dB of the peak power, i.e. at a power that is 10 dB lower or up to 25 dB lower than the peak power.

Figure 8:
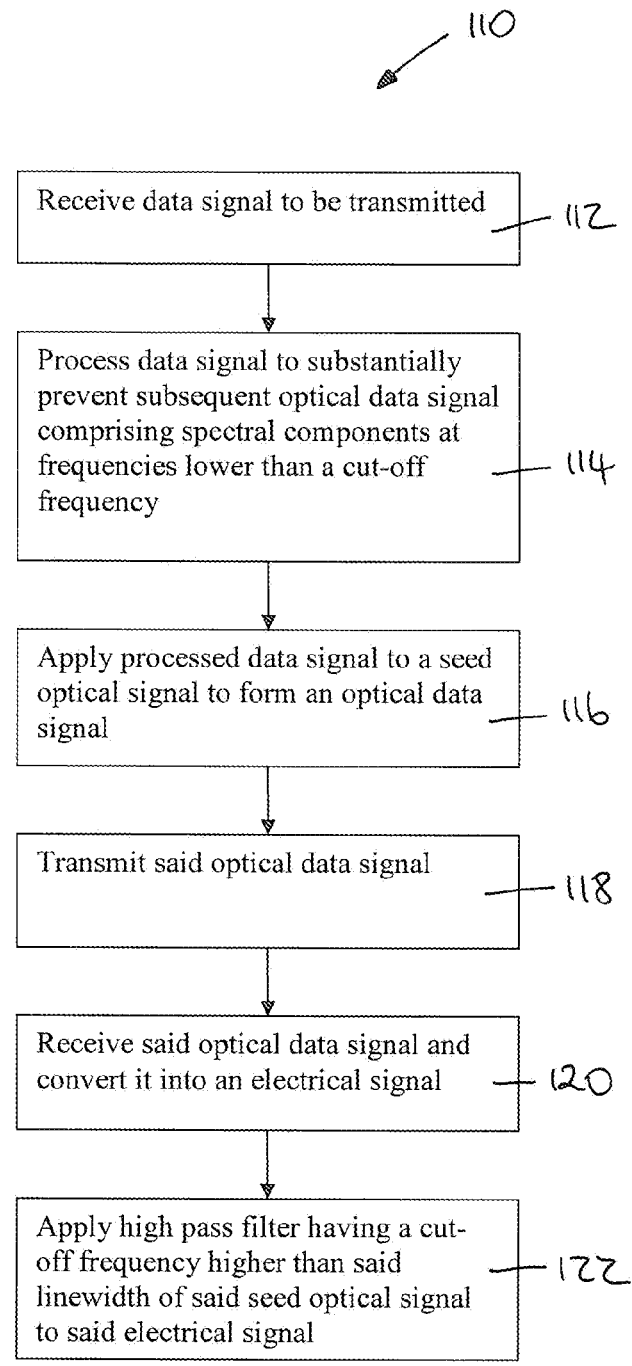
FIG. 8 is a flow chart of a method of transmitting data according to a fifth embodiment of the invention.
Figure 9:
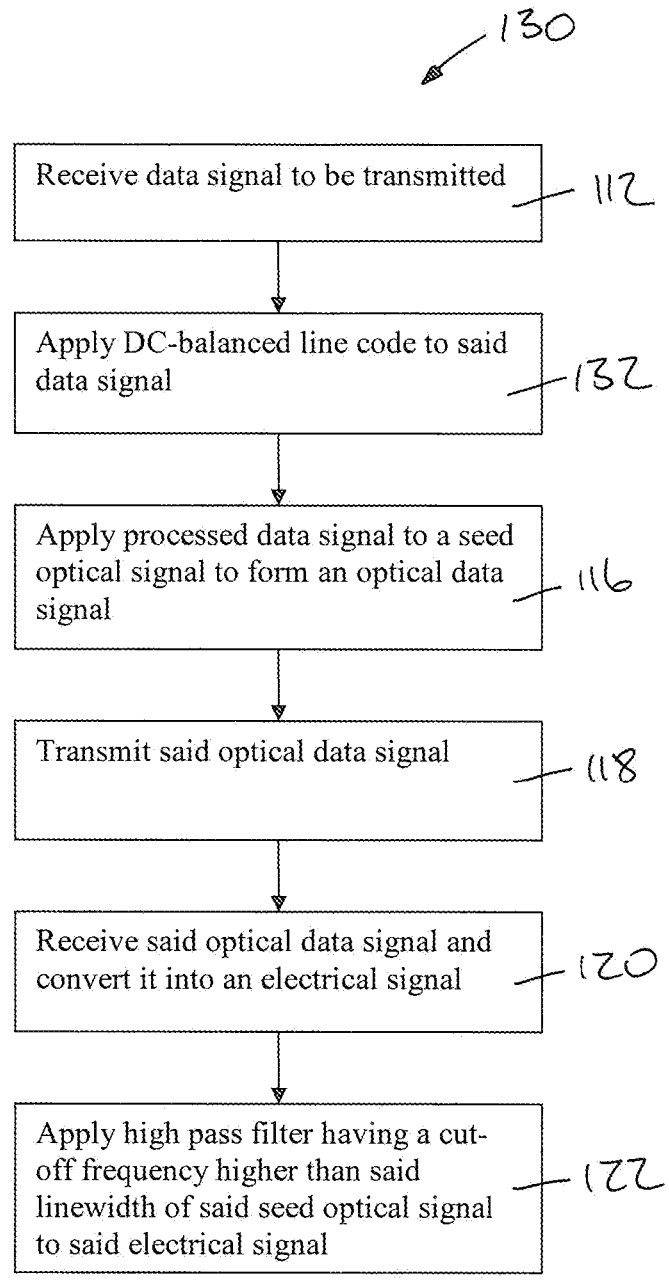
FIG. 9 is a flow chart of a method of transmitting data according to a sixth embodiment of the invention.
Figure 10:
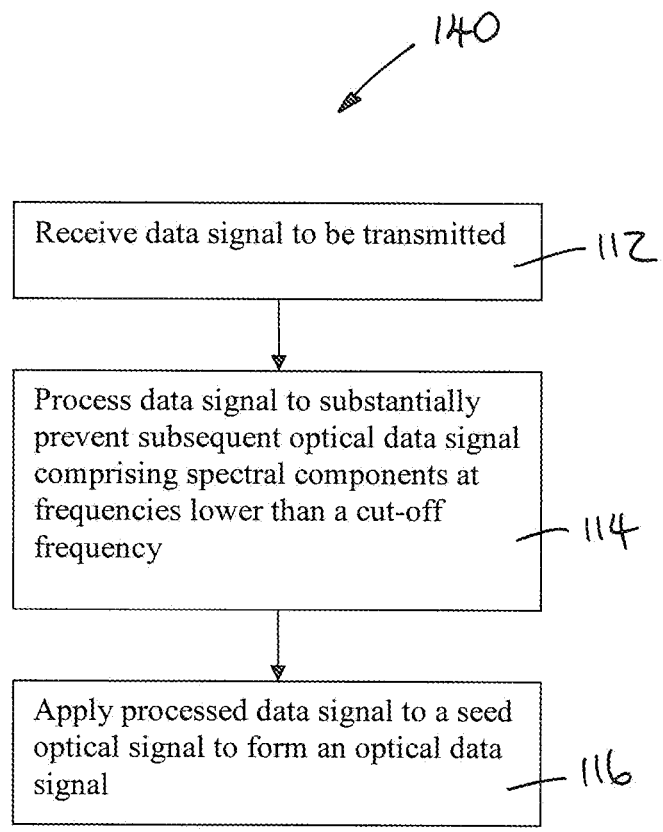
FIG. 10 is a flow chart of a method of providing an optical data signal according to a seventh embodiment of the invention

A sixth embodiment of the invention provides a method 130 of transmitting data in a reflective optical network. The method 130 of this embodiment is substantially the same as the previous method 110 of FIG. 8, with the following modifications. The same reference numbers are retained for corresponding features.

In this embodiment, the method comprises processing a received data signal by applying a DC-balanced line code to the data signal 132. The DC-balanced line code may comprise, for example, an 8B10B line code or a 64B66B line code. Both of these line codes act to substantially remove the low frequency spectral content of the resulting optical data signal. For example, using the 8B10B line code on a 1.25 Gb per second data signal will strongly reduce spectral components at frequencies in the 1-100 MHz range in the resulting optical data signal.

It will be appreciated by the person skilled in the art that other data processing techniques which remove low frequency spectral components may alternatively be used, including, for example, data scrambling. Scrambling is a well-known encoding technique which is widely used in telecommunications and acts to avoid long sequences of 1 bits so that the clock signal can easily be recovered at the receiver. Scrambling will be well-known to the person skilled in the art and so will not be described in detail here.

A seventh embodiment of the invention provides a method 140 of providing an optical data signal for transmission in a reflective optical network. The method 140 is suitable for use with any of the above described reflective optical networks.

The method 140 comprises receiving a data signal to be transmitted 112, processing the data signal 114 and applying the processed data signal to a seed optical signal to form an optical data signal 116. The method comprises processing the received data signal to substantially prevent the resulting optical data signal comprising spectral components at frequencies lower than a cut-off frequency. The processing of the data signal is as described above in relation to the methods 110, 130 of transmitting data in a reflective optical network.

An eighth embodiment of the invention provides a data carrier embodying computer readable instructions for providing access to resources available on a processor. The instructions comprise instructions to cause the processor to perform the steps of either of the above described methods of transmitting data in a reflective optical network. The data carrier may comprise a hardware memory device or storage device, such as a compact disc or a digital versatile disc, or may comprise a data carrier signal by which the instructions may be downloaded or transmitted across a network.

The invention claimed is:

1. A reflective optical network comprising:
   an optical network unit comprising a reflective optical modulator arranged to receive a seed optical signal, and a transmitter controller arranged to receive a data signal and to control said modulator to apply said data signal to said seed optical signal, to form an optical data signal, said transmitter controller being further arranged to process said received data signal to substantially prevent said optical data signal comprising spectral components at frequencies lower than a cut-off frequency which is the frequency at which a power spectral density of said optical data signal is a predetermined percentage of a peak power spectral density of said optical data signal; and
   an optical receiver arranged to receive said optical data signal and comprising an electrical domain high pass filter having a cut-off frequency higher than a linewidth of said seed optical signal.

2. The reflective optical network of claim 1, wherein said transmitter controller is arranged to process said received data signal by applying a line code to said received data signal.

3. The reflective optical network of claim 2, wherein said line code comprises a direct current-balanced line code.

4. The reflective optical network of claim 1, wherein said transmitter controller comprises a scrambler and said transmitter controller is arranged to process said received data signal by scrambling said received data signal in said scrambler.

5. The reflective optical network of claim 1, wherein said high pass filter cut-off frequency is additionally lower than a bandwidth of said data signal.

6. The reflective optical network of claim 1, wherein said network further comprises a seed optical source operable to generate said seed optical signal, said seed optical source being located remote from said optical network unit and connected to said optical network unit by an optical fibre link.

7. An optical network unit for a reflective optical network, the optical network unit comprising:
   a reflective optical modulator arranged to receive a seed optical signal; and
   a transmitter controller arranged to receive a data signal and to control said modulator to apply said data signal to said seed optical signal, to form an optical data signal, said transmitter controller being further arranged to process said received data signal to substantially prevent said optical data signal comprising spectral components at frequencies lower than a cut-off frequency which is the frequency at which a power spectral density of said optical data signal is a predetermined percentage of a peak power spectral density of said optical signal.

8. The optical network unit of claim 7, wherein said transmitter controller is arranged to process said received data signal by applying a line code to said received data signal.

9. The optical network unit of claim 8, wherein said line code comprises a direct-current-balanced line code.

10. The optical network unit of claim 7, wherein said transmitter controller comprises a scrambler and said transmitter controller is arranged to process said received data signal by scrambling said received data signal in said scrambler.

11. An optical receiver for a reflective optical network, the optical receiver being arranged to receive an optical data signal generated from a seed optical signal, said optical receiver comprising an electrical domain high pass filter having a cut-off frequency higher than a linewidth of said seed optical signal.

12. A method of transmitting data in a reflective optical network, the method comprising:
  receiving a data signal to be transmitted;
  processing said received data signal;
  applying said processed data signal to a seed optical signal, to form an optical data signal,
  said processing being arranged to substantially prevent said optical data signal comprising spectral components at frequencies lower than a cut-off frequency which is the frequency at which a power spectral density of said optical data signal is a predetermined percentage of a peak power spectral density of said optical signal;
  transmitting said optical data signal;
  receiving said optical data signal and converting it into an electrical signal;
  and
  applying a high pass filter to said electrical signal, said filter having a cut-off frequency higher than a linewidth of said seed optical signal.

13. The method of claim 12, wherein said processing comprises applying a line code to said received data signal.

14. The method of claim 13, wherein said line code comprises a direct-current-balanced line code.

15. The method of claim 12, wherein said processing comprises scrambling said received data signal.

16. The method of claim 12, wherein said high pass filter cut-off frequency is additionally lower than a bandwidth of said data signal.

17. A method of providing an optical data signal for transmission in a reflective optical network, the method comprising:
  receiving a data signal to be transmitted;
  processing said received data signal; and
  applying said processed data signal to a seed optical signal, to form an optical data signal,
  said processing being arranged to substantially prevent said optical data signal comprising spectral components at frequencies lower than a cut-off frequency said cut-off frequency is the frequency at which a power spectral density of said optical data signal is a predetermined percentage of a peak power spectral density of said optical signal.

* * * * *